United States Patent [19]

Meiners

[11] Patent Number: 5,086,847

[45] Date of Patent: Feb. 11, 1992

[54] HEIGHT ADJUSTMENT MECHANISM FOR FARM IMPLEMENTS

[76] Inventor: Elmo R. Meiners, P.O. Box 126, Anchor, Ill. 61720

[21] Appl. No.: 609,190

[22] Filed: Nov. 2, 1990

[51] Int. Cl.$^5$ ............................................ A01B 63/22
[52] U.S. Cl. ................................... 172/466; 172/240; 172/423; 172/491; 280/43.23
[58] Field of Search ............... 172/310, 240, 466, 413, 172/485, 487, 452, 464, 474, 481, 429, 423, 675, 491; 280/43.23, 43.17; 56/17.1, 17.2

[56] References Cited

U.S. PATENT DOCUMENTS

| | | | |
|---|---|---|---|
| 2,797,542 | 7/1957 | Webster et al. | 172/466 |
| 2,830,519 | 4/1958 | Chandler et al. | 172/413 |
| 3,410,569 | 11/1968 | Blake | 280/43.23 |
| 3,590,928 | 7/1971 | Mirus | 172/240 |
| 3,643,745 | 2/1972 | Betulius et al. | 172/466 |
| 3,648,780 | 3/1972 | Fueslin et al. | 172/413 |
| 3,658,362 | 4/1972 | Fackler et al. | 172/166 |
| 4,044,697 | 8/1977 | Swanson | 172/464 |
| 4,317,489 | 3/1982 | Steinbach | 280/43.23 |
| 4,360,067 | 11/1972 | Schaaf et al. | 172/466 |
| 4,529,215 | 7/1985 | Strand | 172/466 |
| 4,534,416 | 8/1985 | Johnson | 172/466 |
| 4,660,842 | 4/1987 | Watt et al. | 172/413 |
| 4,750,440 | 6/1988 | Pollard et al. | 172/310 |
| 4,974,684 | 12/1990 | Stevens | 172/481 |

Primary Examiner—Dennis L. Taylor
Assistant Examiner—Spencer Warnick
Attorney, Agent, or Firm—Allegretti & Witcoff, Ltd.

[57] ABSTRACT

An improved height adjustment mechanism comprises a height adjustment arm permanently affixed to a wheel mounting member, the wheel mounting member pivoting around a bracket which is permanently connected to the underside of a longitudinal structural member. The height adjusting arm comprises two opposed parallel guide plates, arranged vertically, and attached at their lower extreme to the wheel mounting member. The height adjustment arm is raised and lowered by operation of height adjustment means attached to the top of the arm, the height adjustment means having both ends pivotally attached to the top side of the platform frame member. The guide plates of the height adjustment arm are pierced through with a series of opposing pairs of support openings, to which a support pin may be fitted. Placement of the pin then serves as a physical stop for the underside of the longitudinal structural member as the frame is lowered. The weight of the platform is thus borne by the support pin and the wheel arm. Detachment or release of pressure within the hydraulic means can then occur safely, leaving the platform in its height-adjusted position.

2 Claims, 3 Drawing Sheets

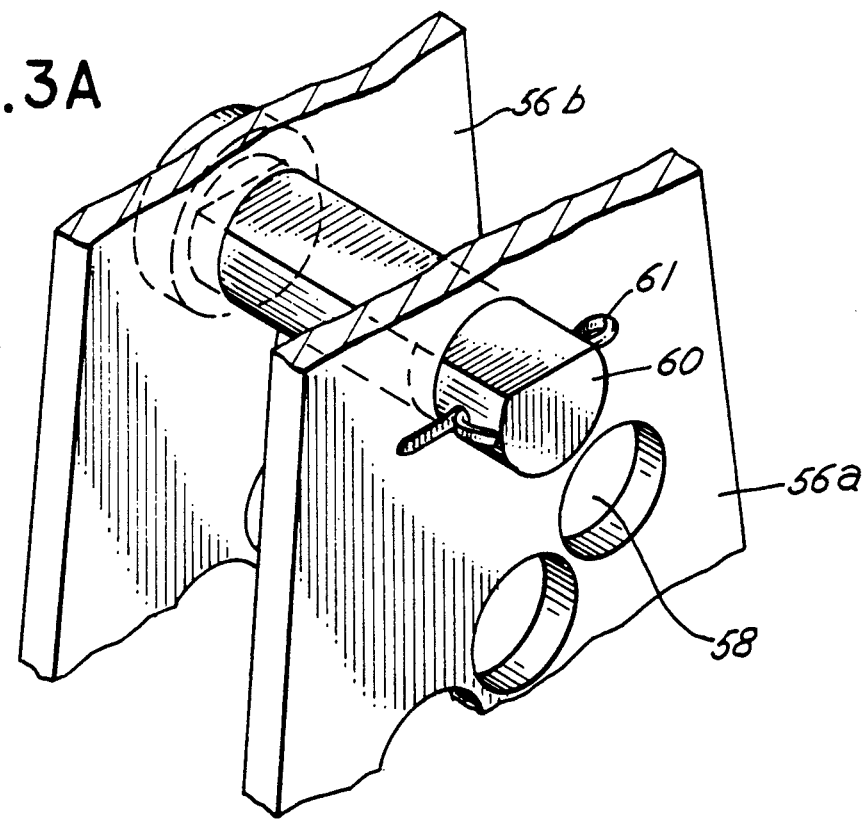
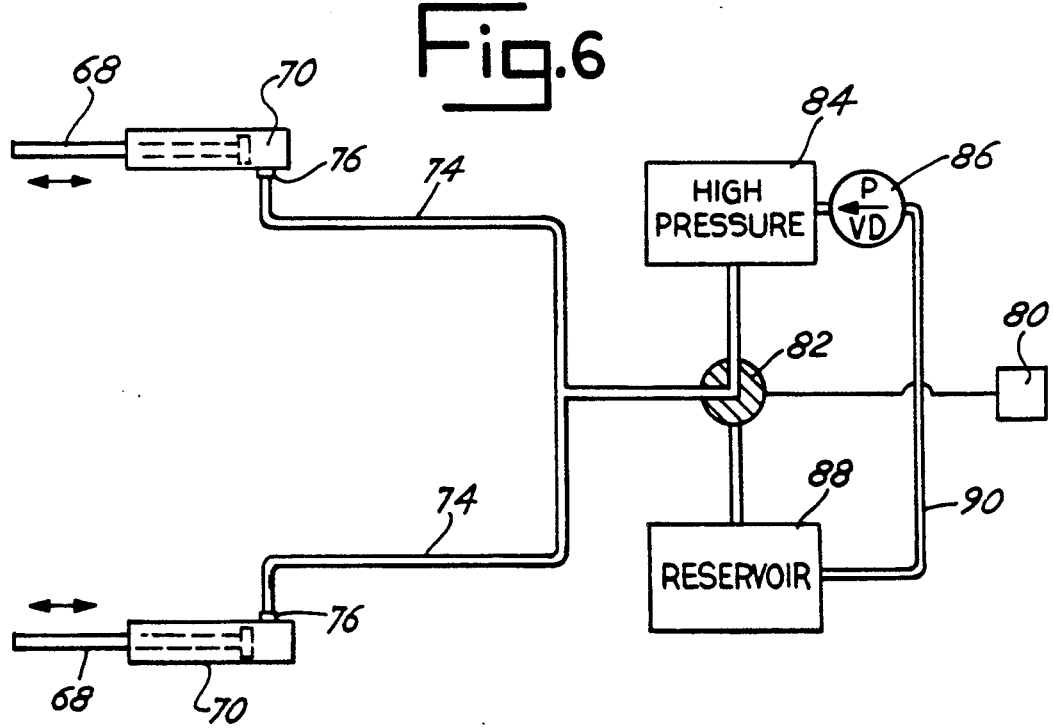

HEIGHT ADJUSTMENT MECHANISM FOR FARM IMPLEMENTS

BACKGROUND OF THE INVENTION

The present invention relates to a vehicular height adjustment control mechanism. More particularly, the present invention relates to an improved height adjustment control mechanism for farm implement platforms or running gear having at least two wheels or ground contact points and that are towed behind a powered vehicle.

Large scale, mechanized agriculture today utilizes many power-driven assemblies of tools and cultivation implements to accomplish the objectives of cultivating and planting fields faster, more efficiently, and with less expenditure of resources. To this end, tractors, combines, and other machines capable of preparing, planting and harvesting large areas have been developed to meet the needs of modern farming. A mainstay of today's agriculture is the tool-carrying platform or running gear that is towed behind a powered vehicle such as a tractor. These farm implement platforms perform many tasks in the field, and it is important that they perform in a flexible yet consistent manner. A key to dependable performance of a platform is maintaining the height at which it traverses the often times uneven and rough surface of a field. If the platform crosses the field parallel to the field's surface, the tools that extend from the platform into the ground will maintain a desired, preset depth of penetration into the earth. This is an important factor in planting because seed depth, for example, determines, in part, when the plants will germinate and subsequently grow. If a crop is late due to being planted too deeply, it may be mature late. This, in turn, exposes the crop to more severe and unpredictable weather.

Various methods and mechanisms have been utilized in the past in an attempt to maintain the attitude of a farm implement platform as it is towed across rough ground. Probably the most basic of all mechanisms incorporates manual adjustment of the platform height. To adjust platform height, the tractor is stopped, and the operator would physically adjust the elevation of the platform. A disadvantage of the manually-adjustable platform is its inability to be easily adjusted without stopping the platform and tractor for significant amounts of time.

Another means commonly used to vary and/or maintain the height of a farm implement platform is through utilization of pneumatic or hydraulic controls and cylinders. (In this application, "hydraulics" as a term shall encompass both air and oil controls and cylinders.) Such means typically necessitate a complex array of pumps, hoses, fluids, valves and cylinders to transmit power and adjust platform attitude. A disadvantage that stems from the very nature of a hydraulic system is its tendency to leak fluid. Movement of mechanical components is attained by applying pressurized fluid to a piston located within a cylinder. The seals required to separate the pressurized hydraulic fluid from the atmosphere wear, and leaks occur. Also, hoses used to interconnect various hydraulic components may crack under extremes of pressure. Constantly changing pressure within the hydraulic system, such as is experienced when encountering rough terrain, stresses the mechanical components, increases the likelihood of leaks developing at joints, and increases the likelihood of hoses developing cracks.

U.S. Pat. No. 3,658,362 (Fackler, et al.) discloses a hydraulic cylinder construction that rotates an axle upon which the wheels are mounted. Extension of the cylinder rod by pressurizing the cylinder moves the wheels down relative to the platform, thus raising the platform. A potential disadvantage of the Fackler system is that the hydraulic cylinder may need to be kept pressurized in order to maintain the desired platform height. This may cause excessive wear of hydraulic components, because constantly changing pressure in the hydraulic system, which occurs when the platform encounters bumps or dips in the ground, can cause faster wear than is preferred. Therefore, some manner of extending the lifetime of a hydraulic system is desired. To this end, some means for relieving pressure on hydraulic hoses and cylinders may extend the life of the hydraulic system.

Another disadvantage of constant-pressure hydraulic systems is that of the crippling effect that occurs when there is a failure of the hydraulics. If a leak develops or the hydraulic fluid level becomes too low, no pressure can be maintained. The system loses its ability to maintain or change its prior position.

SUMMARY OF THE PRESENT INVENTION

The present invention relates to a farm implement platform having an improved height adjustment mechanism that is simple, effective, and safe in the event of failure of the hydraulic system. Generally, the height adjustment mechanism raises and lowers the platform relative to the ground by manipulating the wheel mounting members for the wheels that are in contact with the ground.

The height adjustment mechanism comprises a platform or frame member, which is aligned substantially parallel to the direction of platform travel. A wheel mounting member, upon which a wheel is mounted and kept in continuous contact with the ground, is attached to the platform through a first pivot bracket which is located on and extends below the platform frame member, allowing the wheel mounting member to rotate about a first pivot axis and move in a vertical plane. A height adjustment arm comprising a lever arm is connected to the wheel mounting member. The arm extends from the wheel mounting member upward substantially vertically to a point above the frame member. Means for height adjustment is attached to the top of the lever arm at one end and to the frame at the other end. In a preferred embodiment of the invention, the height adjustment means comprise a hydraulic cylinder-and-rod combination that is used to raise and lower the height adjustment arm. The cylinder end is connected through a second pivot point bracket to the frame member. The rod end attaches to the top of the height adjustment arm. Pressure means are provided for pressurizing the cylinder-and-rod combination. Although the preferred embodiment utilizes hydraulic means, the pressure means may be either hydraulic or pneumatic.

Mechanical means are provided for supporting the frame member upon the height adjustment arm. Typically, a frame support pin with a flat face is provided which fits into the height adjustment arm through support openings and serves to support the weight of the platform by fitting against the underside of the frame. Alternatively, the frame support pin may be fitted through a hole in the longitudinal structural member.

Thus, the pin is inserted through an appropriate opening in the height adjustment arm thereby restricting lowering motion after height adjustment by the hydraulic cylinder-and-rod assembly. This allows for depressurization of the hydraulic system while still maintaining desired elevation of the platform when in use. Insertion of the pin through one selected support opening in the height adjustment arm and lowering the frame onto the support pin will maintain the height adjustment arm in that particular vertical position, thereby maintaining an appropriate height without the continued use of the hydraulic system for support. Integrated control of a pair of height adjustment mechanisms, one per side of the platform, is employed by providing an electrical or mechanical switch that controls a valve that directs the flow of fluid. Note that the present invention may be retrofitted to an existing platform that has no remote height adjustment capability.

Thus, an object of the present invention is to provide a simple height adjustment device that enables the user to remotely control the height of the platform.

Yet another object of the present invention is to provide means for fixing the vertical position of the platform and then releasing the height adjusting pressure, thereby extending the life of the hydraulic components.

Still a further object of the present invention is to provide a height adjustment mechanism that will maintain a preselected height of the platform in the event of failure of the hydraulics, thereby avoiding possible damage to the operator or to the components of the tractor or platform.

Still another object of the present invention is to provide an easy to install height adjustment device, which may be added to a pre-existing platform which does not have remotely operable height adjustment capacity.

These and other objects, advantages and features of the present invention will be better understood in connection with the description which follows.

BRIEF DESCRIPTION OF THE DRAWINGS

In the detailed description which follows, reference will be made to drawings comprised of the following figures:

FIG. 3A is a partial perspective view of the frame support pin of the present invention.

FIG. 6 is a schematic depiction of the central portion of the hydraulic adjustment mechanism.

DETAILED DESCRIPTION OF THE PREFERRED EMBODIMENT

The FIGURES depict the incorporation of the present invention in combination with a farm implement platform. Platforms of this type are most often used to mount farm implements such as cultivator blades, chisel plows or the like and then put them to use in the field. The platform of the present invention is towed behind a powered vehicle, most often a tractor. Of course, other prime movers may be used. The term "platform" as defined herein includes a grid of longitudinal structural members and lateral cross-members that define a roughly rectangular arrangement. However, the term is not intended to be so restrictive. Other structures mounted upon wheels and towed by a powered vehicle across farmland, used for the attachment of farm implements, come within the spirit and scope of this invention.

Figure 1:
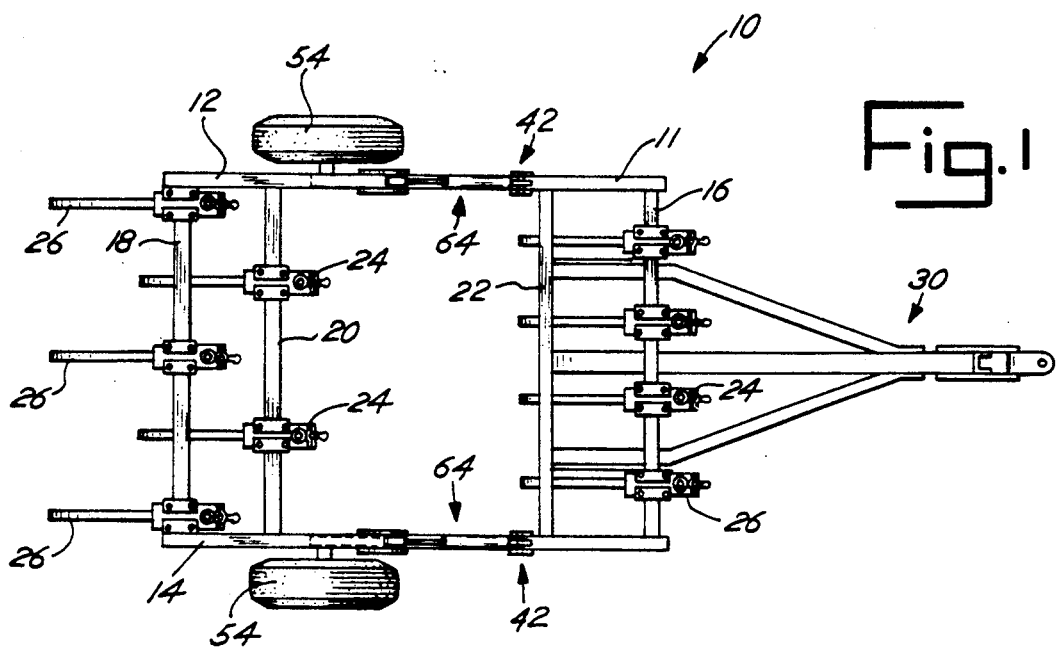
FIG. 1 is a top plan view of the height adjustment mechanism, as embodied in a farm implement platform.
Figure 2:
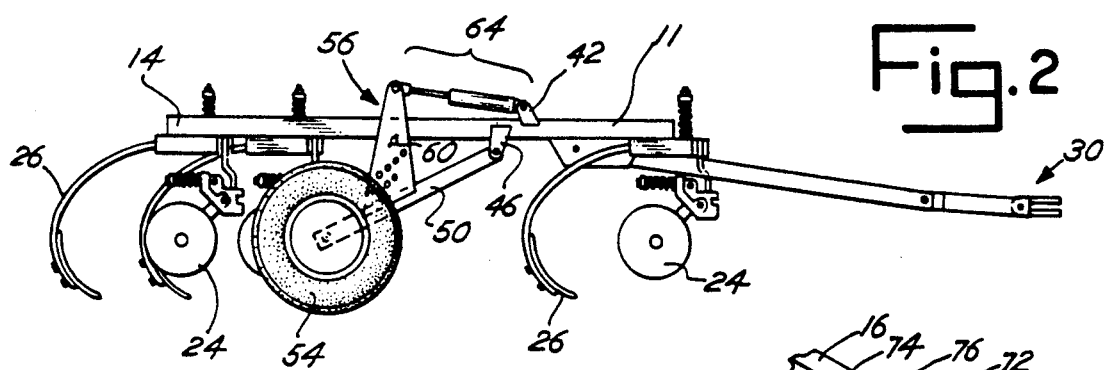
FIG. 2 is a side view of the height adjustment mechanism of FIG. 1.

FIGS. 1 and 2 illustrate the location of the various major components of the present invention, as embodied in a working farm implement platform 10. Means for attaching the frame of the platform to a tractor is shown as the hitch 30. Hitch 30 is provided to facilitate connection of the platform 10 to a tractor or other prime mover (not shown). Platform 10 comprises or includes longitudinal structural members 12 and 14 and lateral cross members 16, 18, 20, 22, which also define supports for the various implements or tools, such as cultivator discs 24 and chisel plows 26. Two brackets 42 and 46 provide means for pivotal attachment of height adjustment means 64, and wheel member 50, respectively. Wheels 54, located on opposite sides of platform 10, are fixed upon wheel mounting members 50 and provide supporting ground contact points. A height adjustment arm 56 extends vertically from each wheel member 50 and provides a lever through which height adjustment means 64 (i.e., hydraulic rod 68 and cylinder 70) exert force to urge wheel member 50 up or down. A frame support pin 60 fits through support openings 58 in height adjustment arm 56, thereby coming into contact with the underside of longitudinal structural member 14, as the platform is lowered. Frame support pin 60 thereby serves to support the weight of the frame, allowing the hydraulic system to be depressurized.

Figure 3:
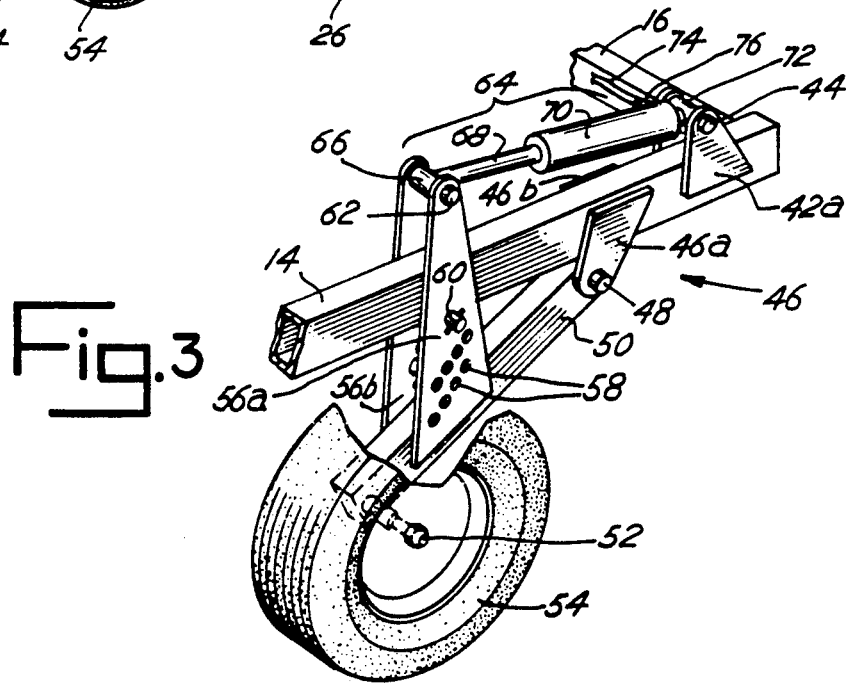
FIG. 3 is a partial perspective view of the height adjustment mechanism of the present invention.

FIG. 3 depicts in a partial perspective view the principal components of the preferred embodiment of the present invention. FIG. 3 shows only a partial perspective section of one side of a farm implement platform.

Referring to FIG. 3, longitudinal structural member 14, which is aligned substantially parallel to the vehicle's direction of travel, is that portion of the frame 11 upon which the height adjustment mechanism is mounted. Two pairs of brackets 42 and 46 are attached to member 14 and provide means for pivotal attachment of height adjustment means 64, and wheel member 50, respectively. The wheel 54 supporting this side of the platform is attached to first bracket 46 in the following manner. First bracket 46 includes two parallel plates 46a, 46b, which are welded to opposite sides of longitudinal structural member 14 and depend therefrom. Plates 46a and 46b have openings adapted to receive a first retaining pin 48, which fits through complementary openings in plates 46a, 46b, and wheel member 50. First retaining pin 48 is then held in place through the use of cotter pins or some other well-known device for securing pins of this type. Thus, insertion of first retaining pin 48 through wheel member 50 and openings in plates 46a and 46b pivotally attaches wheel member 50 to longitudinal structural member 14, allowing pivoting motion in a vertical plane generally parallel to the direction of platform travel. This pivot thereby allows wheel member 50 to rotate through a limited arc relative to longitudinal structural member 14, while joining wheel mounting member 50 to longitudinal structural member 14. Means for retaining wheel 54 upon wheel mounting member 50 include axle 52.

A height adjustment arm 56 is comprised of outer and inner opposed guide plates 56a, 56b, respectively, which are welded to opposite sides of wheel mounting member 50 and extend upwardly on opposite sides of the extended platform longitudinal structural member 14. Plates 56a, 56b are disposed parallel to one another. Since the two guide plates 56a, 56b surround the longitudinal structural member 14, any lateral urgings transmitted through wheel 54 are limited by their presence. Thus, the double-plate construction of height adjustment arm 56 provides lateral stability for wheel 54. Plates 56a, 56b are provided with height adjustment openings 58, arranged in opposed pairs. As more particularly shown in FIG. 3A, a frame support pin 60, having a flat surface for engaging the flat underside of longitudinal structural member 14, detachably engages with operator-selected openings 58 in plates 56a, 56b and is retained in place by a cotter pin 6 or equivalent fastener. Location of frame support pin 60 in an appropriate pair of openings 58 serves to limit vertical motion of height adjustment arm 56 relative to longitudinal structural member 14 by providing a physical stop for longitudinal structural member 14.

Generally, means for height adjustment 64 comprises a hydraulic cylinder 70 and rod 68, pivotally anchored at one end to longitudinal structural member 14, and at the other end to the top portion of height adjustment arm 56. Height adjustment means 64 operates on height adjustment arm 56 by extension or retraction of rod 68. A second pivot means comprises, in the preferred embodiment, a retaining pin 62 fitted through a sleeve 66 integrally combined with rod 68. Retaining pin 62 is itself retained by cotter pins (not shown) or equivalent fasteners. The pivot formed allows vertical movement of height adjustment arm 56 in response to the horizontal urgings of rod 68.

The distal portion of cylinder 70 is attached to a third means for pivotal attachment 42, located upon and above longitudinal structural member 14. Third pivot means 42 has a bracket 42, which is comprised of parallel plates 42a, 42b, which are welded to opposite sides of longitudinal structural member 14. Insertion of third retaining pin 44 through integrally connected sleeve 72 connects cylinder 70 to bracket 42 in the same manner as first means for pivotal attachment 46.

Up or down motion of the platform is achieved by pressurization or depressurization, respectively, of cylinder 70 by hydraulic means. Cylinder 70 is provided with at least one port 76 for connecting a hydraulic line 74. Means for varying fluid pressure within cylinder 70 comprises, in the preferred embodiment, a hydraulic pump component for providing a source of pressurized fluid, a reservoir of low-pressure fluid, and valves that control the flow of hydraulic fluid from component to component. Port 76 serves to allow flow of hydraulic fluid into or out of cylinder 70 upon command of the operator.

Operation of the height adjustment mechanism is effected in the following manner. To raise the platform, cylinder 70 is pressurized with hydraulic fluid upon command by the operator. Assuming the hydraulic pump is running and thereby providing a source of pressurized fluid, the operator's command opens a valve allowing the pressurized fluid to flow into cylinder 70, thereby extending cylinder rod 68, which is pivotally connected to height adjustment arm 56 by the second means for pivotal attachment. Extension of rod 68 from a retracted position inside of cylinder 70 urges height adjustment arm 56 in a downwardly fashion, which, in turn, urges wheel mounting member 50 toward the ground. Since wheel 54 is at all times in contact with the ground, the net effect of pressurizing cylinder 70 is to raise frame 11 in relation to the ground. This is directly due to the levering effect of wheel mounting member 50 upon longitudinal structural member 14 through pivoting at first retaining pin 48. When the desired height is attained, frame support pin 60 is located in a pair of openings, with the flat face up, and secured with a cotter pin. The hydraulic system may then be depressurized or turned completely off, saving wear and tear on the hydraulic components. Frame 11 will then come to rest on frame support pin 60.

Figure 4:
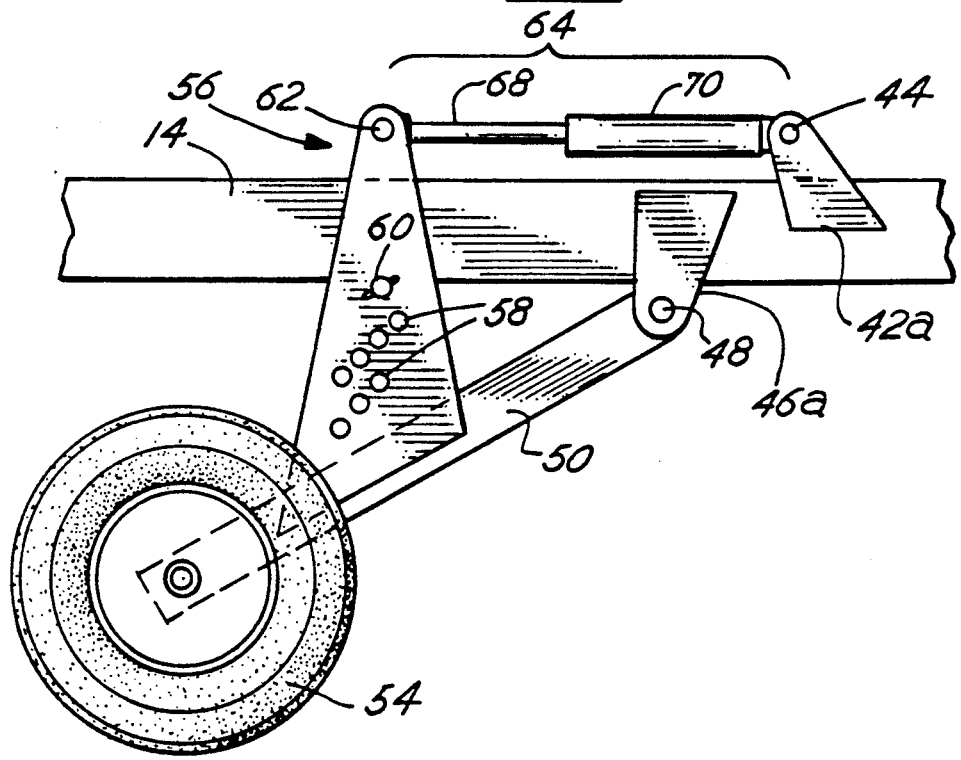
FIG. 4 is a side view of the height adjustment mechanism, showing a wheel in the transport position.
Figure 5:
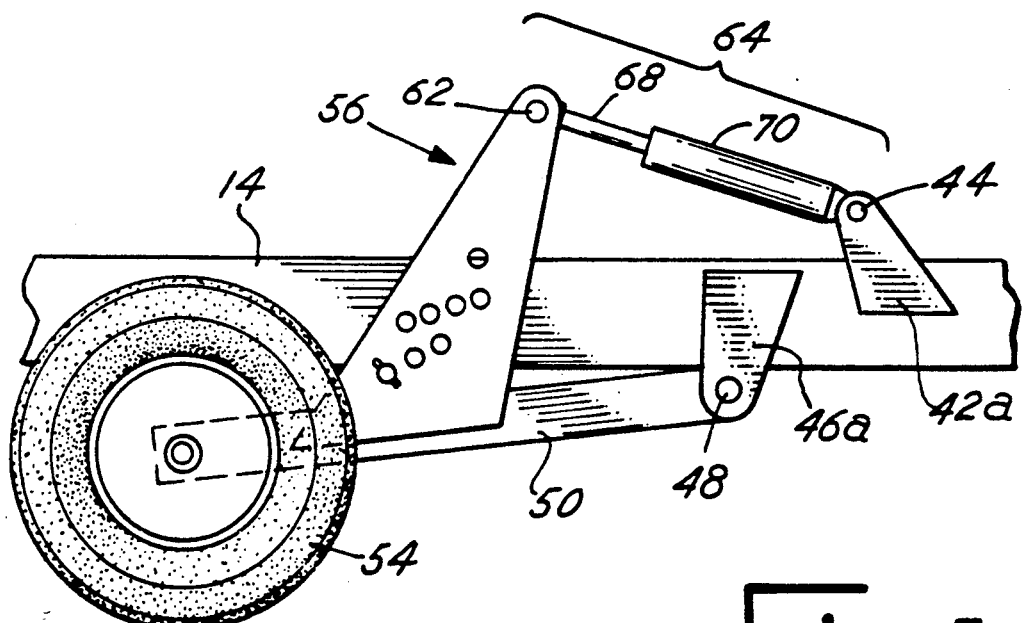
FIG. 5 is a side view of the height adjustment mechanism, showing a wheel in its uppermost position.

Lowering of frame 11 is accomplished by first raising the platform slightly, then removing frame support pin 60. Subsequently, upon operator command, cylinder 70 is depressurized by the opening of a valve connected to port 76. Pressurized fluid escapes, and flows to an unpressurized reservoir (not shown). The platform sinks under its own weight as the fluid escapes, and will stop at a height pre-selected by location of pin 60. FIG. 4 shows frame 11 locked into its highest position, while FIG. 5 depicts the lowest position.

FIG. 6 depicts the means for integrated control of both height adjustments means in the preferred embodiment. Said control means comprises an electrical or mechanical switch or switches 80, whereby operation of said switch controls the position of 2-way valve 82. Valve 82 controls the flow of hydraulic fluid to both cylinders 70 by its position. As shown in FIG. 6, valve 82 is positioned to allow high-pressure fluid to flow from the high-pressure reservoir 84 through hydraulic lines 74 to cylinders 70, thereby extending rod 68. Variable delivery hydraulic pump 86 maintains pressure in high-pressure reservoir 84. Value 82 can be re-positioned to allow exit of high-pressure hydraulic fluid to reservoir 88 by rotating it 90°. Pump supply line 90 connects the low-pressure fluid reservoir to pump 86. It is contemplated that many different constructions, well-known to one of skill in the art, will accomplish the basic purpose of the integrated controls means.

From the foregoing it will be appreciated that, although specific embodiments of the invention have been described herein for purposes of illustration, various modifications may be made without deviating from the spirit and scope of the invention. As examples, the components of the preferred embodiment constitute one form of various means plus function elements in which the invention may be embodied. Accordingly, the invention is not limited except as by the appended claims.

I claim:

1. A towable farm implement platform and an improved height adjustment mechanism comprising, in combination:

a frame having a forward end and rearward end, said frame comprising longitudinal structural members and lateral cross-members, said members having means for securing farm implements thereto, said frame being movable longitudinally over the ground;

means for attaching said frame to a prime mover, said means for attaching connected to the forward end of said frame;

at least one wheel mounting member with a wheel mounted at one end of the wheel mounting member, said wheel mounting member having a pivotal attachment at its opposite end to said a longitudinal structural member, said wheel mounting member being pivotally attached to the longitudinal structural member of the frame for pivotal movement about an axis generally transverse to the direction of platform travel, said wheel mounting member lying and moveable substantially in the same vertical plane as the longitudinal structural member to which it is pivotally attached;

a height adjustment arm comprising first and second planer, parallel guide plates attached to and extending vertically upward from said wheel mounting member and spaced from the pivotal attachment of the arm to the structural member, said guide plates spaced from the pivotal attachment of said wheel mounting member to said longitudinal structural member, said guide plates positioned on opposite sides of the longitudinal structural member and having a plurality of pairs of aligned support openings, said guide plates extending above the longitudinal structural member to define a pivot connection;

means for height adjustment pivotally connected to said guide plates at said pivot connection, said height adjustment means having a second end pivotally connected to said longitudinal structural member;

adjustable means for controlling the length of the means for height adjustment to thereby raise and lower the wheel and;

a frame support pin positioned in one pair of aligned support openings to thereby limit upward pivotal movement of the wheel mounting member.

2. The invention as claimed in claim 1, wherein said frame support pin has at least one substantially flat surface for engagement with the lower side of said longitudinal structural member, whereby the weight of the frame is distributed over said flat surface.

* * * * *